March 18, 1952     F. NETSCHERT     2,589,424
APPARATUS FOR BAKING LACQUER ON METAL ARTICLES
Filed Sept. 8, 1947
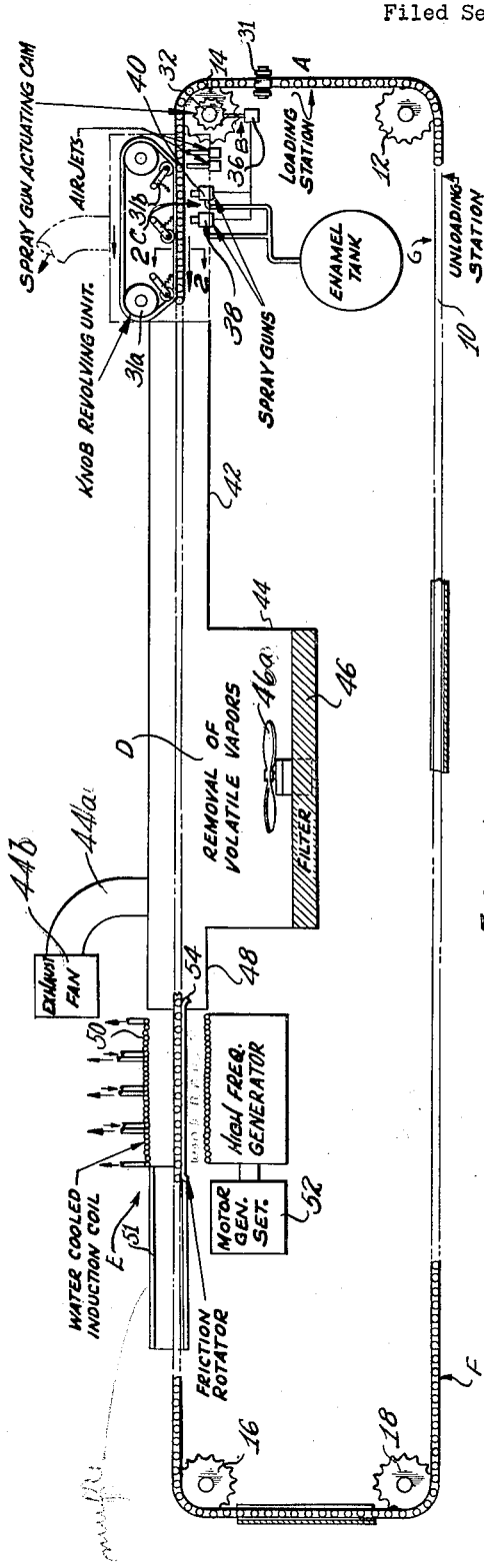
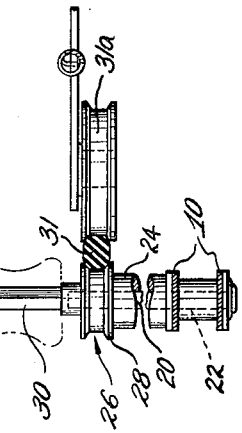
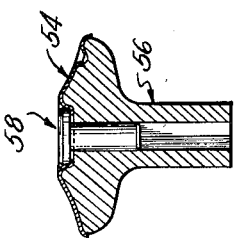
INVENTOR.
FRANZ NETSCHERT
BY *Luther L. Mack*
Attorney Patented Mar. 18, 1952

2,589,424

UNITED STATES PATENT OFFICE 2,589,424

APPARATUS FOR BAKING LACQUER ON METAL ARTICLES

Franz Netschert, Glendale, Calif., assignor to Technical Glass Company, Los Angeles, Calif., a corporation of California Application September 8, 1947, Serial No. 772,615

6 Claims. (Cl. 118—51)

This invention relates to an apparatus for the coating of materials with a durable film and is hereinafter described, by way of example, as applied to coating brass articles of builders' hardware with a transparent coat of enamel in order to maintain the attractive appearance of polished brass-ware for a very extended period without the need for constant polishing.

To produce coated metal articles with a high degree of finish has hitherto necessitated a time consuming sequence of steps and a relatively large work force resulting in a somewhat expensive product; but, by the use of the process of my invention, a large output of high grade product can be produced by a very small work force.

It is an object of the invention to provide an apparatus for coating metal articles in a sequence of operations carried out while the articles are automatically moved through the sequence of operations and delivered to a station in a completely finished condition.

It is a further object of the invention to provide a means for baking lacquer upon metal articles, which is entirely automatic whereby one attendant is enabled to maintain a high output of finished articles.

A still further object of the process is to provide a continuous automatic means whereby the articles are cleaned, coated with enamel which is then baked on, the temperature of the articles being then gradually reduced during a predetermined period, and the finished articles delivered to an unloading station.

Yet another object of the invention is to provide mechanism for carrying out the steps of the above described process of a simple and effective character requiring a minimum of attention and maintenance.

A still further object of the invention is to provide mechanism for continuously conveying the metal articles to be lacquered through a series of stations, some of which are provided with devices automatically and intermittently operated by means moved with the conveyor means so that accurate functioning of the intermittently operated devices is assured.

Another object of my invention is to provide a means for baking enamel on escutcheon plates utilizing the same apparatus as is employed for door knobs and a special adaptor whereby the cost of separate equipment for use with the escutcheon plates is avoided.

Still further features and objects of the invention will hereinafter appear in the following specification taken in conjunction with the accompanying drawings in which I have illustrated a preferred form of the invention.

In the accompanying drawings:

Fig. 1 is a schematic layout showing the arrangement of various pieces of equipment used in carrying out the process of my invention;

Fig. 2 is a detail view looking in the direction of the arrows 2—2 in Fig. 1 showing the arrangement of the articles on an endless conveyor member utilized to move the articles throughout the process;

Fig. 3 is a detail perspective view to an enlarged scale showing the arrangement of the heating coils.

Fig. 4 is a central vertical section through an adaptor used to bake enamel on escutcheon plates with a plate mounted thereon;

In Fig. 1, the numeral 10 indicates an endless belt which is arranged with the pins connecting the links extending vertically around a plurality of chain sprocket wheels 12, 14, 16, 18, one or more of which may be driven at a constant speed by a motor (not shown).

The chain and chain sprocket wheels are preferably mounted on a frame (not shown) which also supports the weight of the chain and guides it between the chain wheels, although, of course, other suitable means may be utilized to discharge these functions.

The chain is utilized as a carrier for the brass plated door knobs by extending certain of the pins 20 of the chain to form spindles 22 on which are mounted spacers 24 and on which rest carrier members 26 comprising a spool 28 formed with a V groove in its periphery and an upwardly projecting stem 30 on which the door knobs are positioned. The stems 30 are rotated by a belt 31 trained around pulleys 31a rotated by any suitable means, the belt being held against the spools 28 as shown in Fig. 2 by spring tensioned pivoted arms 31b, Fig. 1.

Certain of the chain sprocket wheels are also utilized to operate jets which act on each knob as it is brought into position by the chain which thus acts as synchronizing means as well as conveying means.

The chain conveyor carries the articles from the loading station A, through an air blast B, spray C, evaporator D, furnace E, heat retaining muffle 51 and a cooling return stretch F to the unloading station G.

At the loading station A, an operator picks up the door knobs which have been previously buffed and places them on the stems 30.

The chain which is moved at approximately one mile an hour carries the door knobs around sprocket 14 on which is mounted a cam wheel 32 which through any suitable mechanism operates to release a blast of air from two air nozzles (lower nozzle not shown) 36, one of which is directed against the underside of the door knob, the other against the upper side of the door knob, thus ensuring that any dust, lint or other light material which might be adhering to the articles is blown off. Brushes bearing against the periphery of the door knobs may be utilized if desired in cooperation with the air jets 36.

The door knobs then are carried into registration with the spray C which includes nozzles 38 and 40, and a tank of lacquer preferably kept at a suitable temperature by an electrical heater or other means.

The lacquer is fed under pressure by any suitable means to a pair of electro-magnetically, or mechanically, controlled spray nozzles 38, 40, the valves being operated by a contact closed by the cam 32. Nozzles 38, 40 are directed one against the top and the other against the underside of the door knobs so as to evenly coat the door knobs with lacquer.

The door knobs then enter an inlet passage 42 connected to the device D for removing the volatile solvents in the lacquer by flowing a stream of filtered air over the lacquer coated knobs.

The device D comprises a housing 44 having an air intake 46 fitted with filtering material to remove dust and dirt from the air drawn through the housing by an induction fan 46a and exhausted from the casing by power driven fan 44b through a conduit 44a leading from said housing. Preferably, a slight superatmospheric pressure is maintained in the housing so that unfiltered air will not be drawn into it through the inlet passage 42 or through the outlet passage 48.

The outlet passage 48 terminates at the high frequency induction furnace E in which a series of copper tube coils 50 are water cooled. The coils are supplied with high frequency alternating current by the motor generator 52 and any suitable high frequency generator.

It is desirable, in order to secure even and rapid heating, that the knobs be rotated as they are carried through the baking heater, and for this purpose I provide a wooden rail 54 engaged by the spools 28 of the carriers 26 as they are carried through the heater.

Although the knobs pass through the heater in less than one half minute, they are raised to a temperature of approximately 350° F., and the enamel is thoroughly baked in that time. A muffle 51 surrounds the knobs leaving the furnace or oven and is effective to maintain them at a sufficiently high temperature for a length of time adequate to ensure that all volatile elements are baked out of the enamel.

It is advisable to allow a certain length of time for the lacquer to become completely cured and this is provided for by the length of the return path to the unloading zone which may, as shown, be arranged in the open air, the knobs cooling down to about room heat by the time the unloading station is reached.

It is obvious that the rate at which the conveyor chain is run and the provision made for cooling the knobs, as well as the temperature to which the knobs are raised, are matters which may be adjusted to suit variations of the lacquer used, character of the knobs to be lacquered, and the like.

I have found that I am enabled to utilize the apparatus previously described for baking enamel on the escutcheon plates fitted to doors with the knobs previously described.

The form of the escutcheon plate shown in Fig. 4 has to be protected against overheating of the plate around its edges and also against being blown off its carrier by the force of the air and lacquer blasts. It was discovered that by the use of a metal plug inserted through the center hole of the escutcheon plate into a bore in the carrier both objects were achieved.

In Fig. 4, the escutcheon plate is indicated at 54 and the carrier at 56. It is to be noted that the carrier shown is contoured to the shape of the plate but may have any other suitable form. The carrier is mounted on the pins projecting from the conveyor chain and is operated in all respects similarly to the door knobs except that the lower enamel and air jets are shut off.

The center of the carrier 56 is provided with an axial vertical recess, a headed steel plug 58 being positioned therein with its head acting to hold down the escutcheon plate during passage of the carrier past the jets.

The steel plug serves to increase the rate of heating of the center part of the escutcheon plate while passing through the induction heater so that the plate is evenly heated and overheating of the outer rim avoided.

In operating the process any suitable lacquer or enamel may be used which is impervious to water and forms a tough, durable film on the metal or other material of the articles. Further, such coating material may be transparent or opaque, but for the purpose of covering bright metal knobs, for instance, of aluminum or brass, I prefer to use a commercial product, a resinous product of urea, an aldehyde and an alcohol. A transparent coating is produced which is quite clear, does not color with exposure, produces a very tough and durable coating, and is impervious to water. Spraying is carried out under a hood from which waste spray is exhausted by an electrically driven fan.

The induction heating unit is provided with water cooled coils 60 shaped to follow the contour of the articles as indicated in Fig. 3, the coils being arranged to provide a free path for the conveyor means and to avoid heating the conveyor chain. A heating unit utilizing a frequency of 10,000 cycles with a power output of 12.5 kw. at 220 volts is sufficient to produce very satisfactory functioning of the apparatus and process. Since the driving means for the component parts of the apparatus may be arranged in any suitable known manner, it is not thought necessary to illustrate or describe them.

The process as at present in use produces about 800 treated door knobs an hour per operator which is an output much greater than that of any other process of producing a comparable article coated with a baked enamel of which I am aware. By the term "enamel" used herein, I intend to mean any suitable coating material, either resinous or containing cellulose, or a mixture of both, or any material producing a tough coating by a baking operation.

I have described electrical apparatus suitable for baking enamel on metal articles, but the process and apparatus may be used to bake enamel on non-metallic articles by the use of higher frequencies in the electrical heating means, or by using dielectric heating equipment in place of the induction heating described.

While I have particularly described a preferred embodiment of my invention, it is to be understood that various changes and modifications in the process and apparatus may be made without departing from the scope of the invention as set forth in the appended claims.

I claim:

1. In an enameling machine for metal articles having a continuously traveling conveyor furnished with article carriers and moving the articles through an enamel spray applying mechanism and subsequently through a high frequency electrical induction heating means for baking enamel and finally through a cooling zone: a housing extending around the conveyor arranged between the enamel applying mechanism and the enamel baking unit and having an air intake opening in the wall thereof; an air filter mounted in said air intake; and electric fan means cooperating with said housing to flow filtered air over the articles carried by the conveyor to evaporate solvent from the enamel coating on the articles and maintaining the pressure of the air in said housing above that of the atmosphere.

2. In an enameling machine for metal articles having a continuously traveling conveyor furnished with article carriers and moving the articles through an enamel spray applying mechanism and subsequently through a high frequency electrical induction heating means for baking enamel and finally through a cooling zone: means for rotating the articles on the carrier to ensure even heating of the articles while passing through said induction heating means comprising: a rail of electrically non-conductive material extending parallel to the length of the conveyor in the induction furnace, and spools on the carriers for the articles engaging with said rail to rotate said articles.

3. In an enameling machine for metal articles having a continuously traveling conveyor furnished with article carriers and moving the articles through an enamel spray applying mechanism and subsequently through a high frequency electrical induction heating means for baking enamel and finally through a cooling zone: a muffle surrounding the conveyor and extending from the induction baking unit in the direction of travel of the articles leaving said unit and open at its end away from said unit thereby retarding the rate of loss of heat by the articles from the temperature at which the articles leave the heating unit to that at which the articles emerge from the muffle and any residual volatile material in the enamel is removed.

4. In an enameling machine for metal articles having a continuously traveling conveyor furnished with article carriers and moving the articles through an enamel spray applying mechanism and subsequently through a high frequency electrical induction heating means for baking enamel, and finally through a cooling zone; a housing extending around the conveyor arranged between the enamel applying mechanism and the enamel baking unit and having an air intake opening; an air filter mounted in said air intake; and electric fan means cooperating with said housing to flow filtered air over the articles carried to the conveyor to evaporate solvent from the enamel coating on the articles and maintaining the pressure of the air in said housing above that of the atmosphere, a rail of electrically non-conductive material extending parallel to the length of the conveyor in the induction furnace, and spools on the carriers for the articles engaging with said rail to rotate said articles.

5. In an enameling machine for metal articles having a continuously traveling conveyor furnished with article carriers and moving the articles through an enamel spray applying mechanism and subsequently through a high frequency electrical induction heating means for baking enamel and finally through a cooling zone: a housing extending around the conveyor arranged between the enamel applying mechanism and the enamel baking unit and having an air intake opening in the wall thereof; an air filter mounted in said air intake; and electric fan means cooperating with said housing to flow filtered air over the articles carried by the conveyor to evaporate solvent from the enamel coating on the articles and maintaining the pressure of the air in said housing above that of the atmosphere, a muffle surrounding the conveyor and extending from the induction baking unit in the direction of travel of the articles leaving said unit and open at its end away from said unit thereby retarding the rate of loss of heat by the articles from the temperature at which the articles leave the heating unit to that at which the articles emerge from the muffle and any residual volatile material in the enamel is removed.

6. In an enameling machine for metal articles having a continuously traveling conveyor furnished with article carriers and moving the articles through an enamel spray applying mechanism and subsequently through a high frequency electrical induction heating means for baking enamel and finally through a cooling zone: means for rotating the articles on the carrier to ensure even heating of the articles while passing through said induction heating means comprising: a rail of electrically non-conductive material extending parallel to the length of the conveyor in the induction furnace, and spools on the carriers for the articles engaging with said rail to rotate said articles; a muffle surrounding the conveyor and extending from the induction baking unit in the direction of travel of the articles leaving said unit and open at its end away from said unit thereby retarding the rate of loss of heat by the articles from the temperature at which the articles leave the heating unit to that at which the articles emerge from the muffle and any residual volatile material in the enamel is removed.

FRANZ NETSCHERT.

REFERENCES CITED

The following references are of record in the file of this patent:

UNITED STATES PATENTS

| Number | Name | Date |
|---|---|---|
| 336,157 | Puttmann et al. | Feb. 16, 1886 |
| 732,046 | Cameron et al. | June 30, 1903 |
| 1,271,027 | Gail | July 2, 1918 |
| 1,385,492 | Prichard | July 26, 1921 |
| 1,555,860 | Ledwinka | Oct. 6, 1925 |
| 2,088,542 | Westin | July 27, 1937 |
| 2,140,337 | Somes | Dec. 13, 1938 |
| 2,141,911 | Hazen | Dec. 27, 1938 |
| 2,167,798 | Denneen et al. | Aug. 1, 1939 |
| 2,210,187 | Ross | Aug. 6, 1940 |
| 2,259,935 | Johnson | Oct. 21, 1941 |
| 2,271,442 | Sanborn | Jan. 27, 1942 |
| 2,328,225 | Morey | Aug. 31, 1943 |
| 2,330,880 | Gladfelter | Oct. 5, 1943 |
| 2,334,648 | Ransburg et al. | Nov. 16, 1943 |
| 2,401,582 | Owen | June 4, 1946 |
| 2,461,582 | Paasche | Feb. 15, 1949 |

FOREIGN PATENTS

| Number | Country | Date |
|---|---|---|
| 463,290 | Great Britain | Mar. 25, 1937 |